(12) United States Patent
Jørgensen

(10) Patent No.: US 7,563,054 B2
(45) Date of Patent: Jul. 21, 2009

(54) MARKING TAPE WITH PASSIVE RESONANT CIRCUITS AND METHODS OF USE

(76) Inventor: Poul Richter Jørgensen, Saugskærvej 16, Thurø, DK-5700, Svendborg (DK)

( * ) Notice: Subject to any disclaimer, the term of this patent is extended or adjusted under 35 U.S.C. 154(b) by 227 days.

(21) Appl. No.: 10/580,106

(22) PCT Filed: Nov. 1, 2004

(86) PCT No.: PCT/IB2004/052254

§ 371 (c)(1),
(2), (4) Date: Dec. 22, 2006

(87) PCT Pub. No.: WO2005/050258

PCT Pub. Date: Jun. 2, 2005

(65) Prior Publication Data

US 2007/0216571 A1    Sep. 20, 2007

(30) Foreign Application Priority Data

Nov. 21, 2003    (DK) .............................. 2003 01724

(51) Int. Cl.
*G01V 15/00*    (2006.01)
(52) U.S. Cl. ........................................ 405/157; 324/326
(58) Field of Classification Search ................. 405/157; 324/326
See application file for complete search history.

(56) References Cited

U.S. PATENT DOCUMENTS

| 4,369,557 | A |   | 1/1983 | Vandebult |
| 4,654,639 | A | * | 3/1987 | De Courville ............... 405/157 |
| 4,767,237 | A |   | 8/1988 | Cosman et al. |
| 5,017,415 | A | * | 5/1991 | Cosman et al. ............. 405/157 |
| 5,045,368 | A | * | 9/1991 | Cosman et al. ............. 405/157 |
| 5,116,654 | A |   | 5/1992 | Cosman et al. |
| 5,200,704 | A | * | 4/1993 | Clark et al. ................. 405/157 |
| 5,201,988 | A |   | 4/1993 | Matsumoto et al. |

FOREIGN PATENT DOCUMENTS

| DE | 31 51 523 | 7/1983 |
| EP | 0 435 585 | 7/1991 |
| GB | 2 378 250 | 2/2003 |
| JP | 2-210288 | 8/1990 |

* cited by examiner

*Primary Examiner*—Frederick L Lagman
(74) *Attorney, Agent, or Firm*—Stites & Harbison PLLC; Ross F. Hunt, Jr.; Douglas E. Jackson

(57) ABSTRACT

A marking tape comprising at least one resonant circuit, each resonant circuit comprising an inductive coil and a capacitor, forming a resonant circuit of a selected frequency, comprises inductive coils and capacitors formed by conductive material layers (2, 3, 4) on the surfaces of a dielectric plastic film (1) and is dimensioned to be wireless detected when positioned in a hidden location. Such marking tape can be produced with low cost and provide a wireless detection of the integrity of a marking tape in a hidden position, e.g. from the surface above a subterranean positioned marking tape.

14 Claims, 5 Drawing Sheets

MARKING TAPE WITH PASSIVE RESONANT CIRCUITS AND METHODS OF USE

TECHNICAL FIELD

The present invention relates to a marking tape comprising at least one passive resonant circuit of the kind set forth in the preamble of claim 1.

BACKGROUND ART

In marking tapes of this kind it is known to provide a marking tape with passive resonant circuits, each resonant circuit comprising an inductive coil and a capacitor forming a resonant circuit of a selected frequency. A marking tape of this kind is known from U.S. Pat. No. 4,767,237, in which the activation of the resonant circuits is provided by electromagnetical coupling between the resonant circuits and a pair of conductors extending the length of the tape and at one end being mutually connected and at the opposite end a signal is applied to the conductors in order to activate the resonant circuits. The activated resonant circuits are detected in conventional way by means of a detecting device from the surface above the subterranean positioned marking tape.

A similar construction is disclosed in JP-A-2210288, In which the inductor is formed by a spiral body which is connected to a chip-type capacitor by means of connecting wires. This is a relatively expensive construction due to the necessary working for mounting and connecting the chip-type capacitors. In the area of electronic article surveillance tags, similar resonance circuits are known, e.g. from U.S. Pat. No. 4,694,283 and U.S. Pat. No. 4,369,557. These documents describe relatively complex constructions, which are requiring a folding operation during production, leading to a high production price and possible large variations in the achieved resonance frequencies. In this area it is a prime objective to make the EAS-tag as small as possible in order to reduce production costs and to make the attachment of tags to all articles convenient.

DISCLOSURE OF THE INVENTION

It is the object of the present invention to provide a marking tape of the kind referred to above, with which it is possible to produce the marking tape at low costs and at the same time to provide a wireless activation and detection of a marking tape in a hidden position, e.g. from the surface above the subterranean positioned marking tape, and this object is achieved with a marking tape of said kind, which according to the present invention also comprises the features set forth in the characterising clause of claim 1. With this arrangement the marking tape can be produced by a relatively low-cost production process in which conductive material layers on the surfaces of the dielectric plastic film are provided and formed e.g. by providing an aluminium layer on both sides of the dielectric plastic film and etching said layers to provide the inductive coils and capacitors for the resonant circuits. By providing the Inductive coils having only a few windings, preferably one single winding, and dimensioning these coils to have a sufficient size, it is possible to provide a wireless detection from e.g. the surface above a subterranean positioned marking tape, e.g. using the techniques known from resonant tag circuits in EAS-systems.

Preferred embodiments of the invention are revealed in the sub-ordinate claims. By the use of inductive coils having one single winding, or a few windings, the corresponding capacitor is of relatively high capacity value, which leads to less influence by stray capacities on the resonant frequency. As is known from the above-mentioned security tags, the capacitors can be formed by a conductive layer on one side of the dielectric plastic film and an oppositely positioned conductive layer on the opposite side of the dielectric plastic film. By providing the conductive material layers forming the coils and capacitors on surfaces of the dielectric plastic film in such a way that a possible break in the marking tape results in loss of resonance or displacement of resonance frequency of at least one of the resonant circuits, it is possible to detect such an effect in the dielectric plastic film which would indicate that the marking tape has been subjected to excessive mechanical load, which may indicate that the surrounding subterranean formations have lost their supporting properties or that the marking tape has been dug up.

By using different resonance frequencies for marking different objects it is possible to seek for specific objects marked by such tape using the resonance frequency for the specific object to be detected. In order to be able to adjust the resonance frequency in a simple manner, the capacitors can be formed with finger-like patches, which can be selectively disconnected from the rest of the capacitors in order to change the capacitance and accordingly the resonance frequency of the resonant circuits. By the provision of different resonance frequencies for individual resonance circuits on the same marking tape, it is possible to detect these separate frequencies and accordingly detecting the integrity of the marking tape by detecting the correct sequence of resonance frequencies along the marking tape. The marking tape can naturally be directly connected to or integrated into the object to be marked and detected, such as e.g. plastic pipe for subterranean utilities.

In order to improve the frequency stability, by reducing the stray capacities, a distance layer may be provided on one or both sides of the dielectric plastic film with the conducting material layers thereon, in order to provide an isolating distance to possible surrounding conducting materials, such as wet soil or the like. Depending on the environment in which the marking tape is to be used, the distance layer in the form of an isolating foil may have a thickness of between a few micrometers to several millimeters. The thickness of the distance layer may also be used to provide an increased and/or well-defined breaking strength for the marking tape.

If detecting of the marking tape is intended to be provided from a moving vehicle, it is advantageous to have coils of elongate form extending primarily in the longitudinal direction of the marking tape, whereby the time for passing over such an Inductive coil can be made sufficient to be able to detect the presence of the resonant circuit and its resonance frequency. The marking tape may be integrated in a geotexulle material in order to be able to detect the integrity thereof, such a construction being especially well suited for geotextile materials used under railway tracks.

Different methods of using the marking tape are revealed in the following detailed description and claims.

BRIEF DESCRIPTION OF THE DRAWINGS

In the following detailed part of the present description, the invention will be explained in more detail with reference to the exemplary embodiments of a marking tape according to the invention shown in the drawings, in which FIG. 1 schematically shows an exploded view of the structure of a marking tape in accordance with a preferred embodiment of the invention, FIG. 2 schematically shows the superimposed layers forming the capacitor of the resonance circuit comprising finger-like patches in accordance with a preferred embodiment of the invention, FIG. 3 schematically shows a marking tape construction in accordance with the invention integrated in a subterranean conduit, FIG. 4 schematically shows the use of a marking tape in accordance with the present invention integrated in a geotextile used under railway tracks, where the integrity of the geotextile is detected from the moving train, FIG. 5 schematically shows the marking tape in accordance with the present invention integrated in a bridge construction for detecting possible dislocations in the structure, and FIG. 6 schematically shows the use of resonance circuits in accordance with the present invention for detecting possible dislocations in hidden structures of a building construction, such as dislocations in the roof construction or floor structure of the building.

DETAILED DESCRIPTION OF THE PREFERRED EMBODIMENTS

Figure 1:
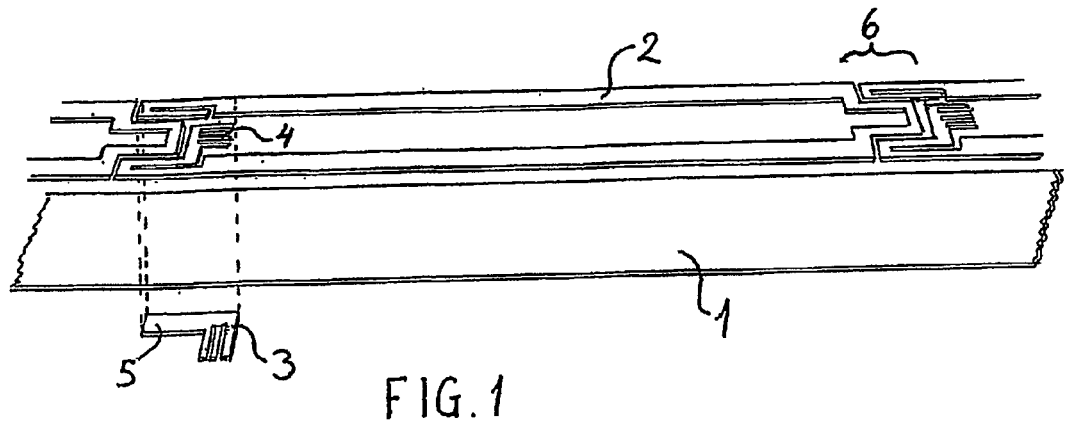

The marking tape shown in FIG. 1 comprises a dielectric plastic film 1 provided with conductive material layers 2, 3 and 4 on the upper and lower surfaces thereof. The conductive material layer 2 on the upper side, as seen in FIG. 1, is configured to form an inductive coil, in the embodiment shown in FIG. 1 comprising only one single generally rectangular turn of a coil, and terminating at one end in a conductive area 4. On the opposite side of the dielectric plastic film, the conductive material layer 3 is formed to provide a conductive area disposed opposite the conductive area 4 of the upper side and a connection element 5 is provided for forming an electrical connection to that terminal of the inductive coil 2, which is positioned opposite the above-mentioned conductive area 4. This connection is e.g. provided by providing a number of irregular small holes through the dielectric plastic film 1.

Figure 2:
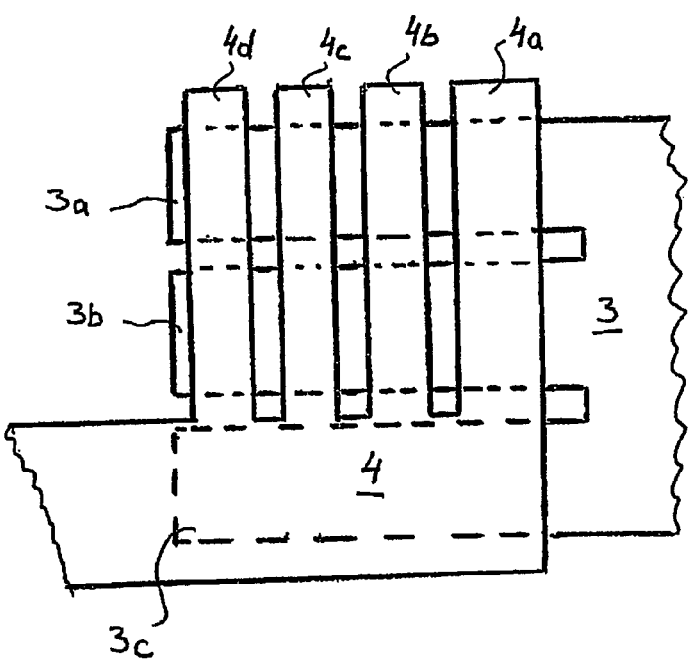

As shown in FIG. 2, the conductive material layers forming the capacitor are formed with finger-like patches 4a-d, 3a-c, whereby the capacity of the capacitor can be adjusted by disconnecting selected parts of these finger-like patches, thus adjusting the resonance frequency of the resonance circuit.

In order to secure that any cross-wise break in the dielectric plastic film 1 will destroy at least one resonance circuit, the inductive coil is formed as an elongate mainly square coil comprising an overlapping range 6 with the next subsequent coil, e.g. as shown in FIG. 1 with one coil indented in the next subsequent coil in the longitudinal direction of the marking tape.

Typical values for the inductance L, capacitance C and resonance frequency F are L=0.5-0.8 µH, C=400-700 pF, and F=5-10 MHz, but other values can naturally be used dependent on the intended use of the marking tape.

Figure 3:
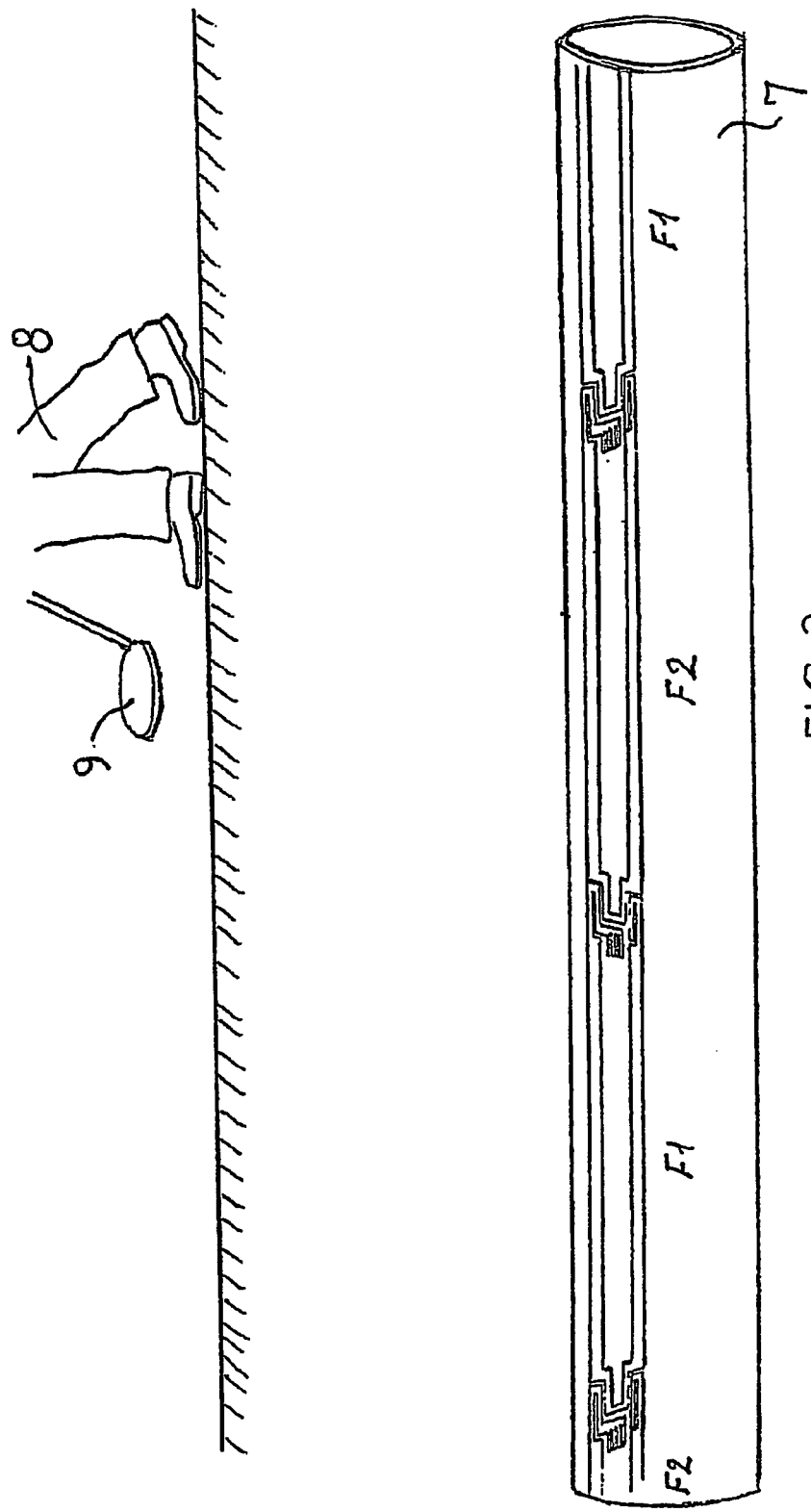

In FIG. 3 the marking tape is shown integrated in a subterranean conduit 7 and this figure shows how a person 8 walking above the subterranean conduit 7, using an activating and detecting device 9, detects the presence of the resonance circuits, whereby the integrity of the conduit 7 and the position thereof can be detected.

In order to improve the quality of the detection of the integrity of the subterranean marking tape, the individual resonance circuits can have different resonance frequencies, e.g. two different resonance frequencies in such a way that every second resonant circuit has one resonant frequency F1 and the intermediate resonant circuit has a resonant frequency F2. In this way, it will be known to the person detecting the marking tape that the resonant frequency should always change between these two resonant frequencies F1 and F2.

In a further improved embodiment, the two frequencies F1 and F2 are supplemented with a third resonant frequency F3 and the resonant frequencies of the resonant circuit are positioned such that the resonant frequency changes between F1 and F2 and after 2N resonant circuits a resonant circuit with a resonant frequency F3 is positioned and it is thus known that N changes between the resonant frequencies F1 and F2 should always be followed by the resonant frequency F3. If the number of changes between F1 and F2 is not equal to N between two resonant circuits with the resonant frequency F3, it is thus indicated that a defective resonant circuit is present between the two positions where F3 is detected.

Figure 4:
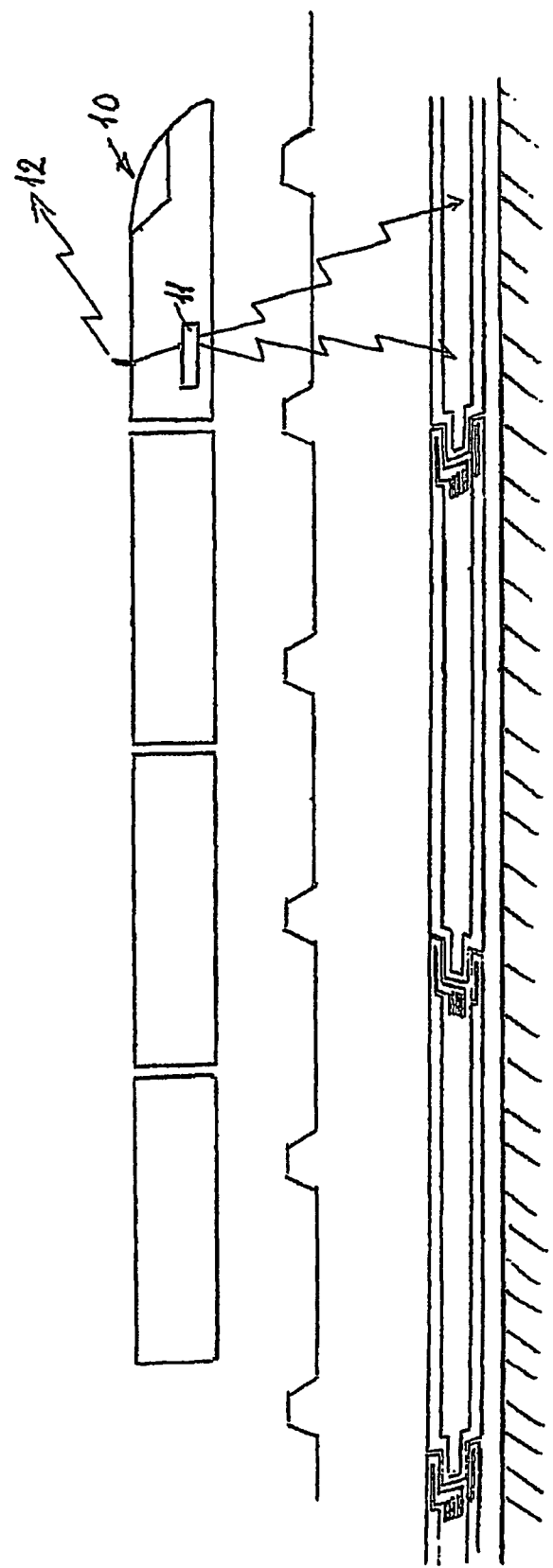

This last preferred embodiment of the marking tape is especially advantageous in a system, in which the detection of the integrity of the marking tape is performed from a moving object 10, such as a train 10 or a car moving above the marking tape, as schematically shown in FIG. 4. In this connection, a special detection device 11 is mounted inside the train 10 or car or like moving vehicle, said special detection device 11 comprising a counter counting the number of frequency changes between F1 and F2 and indicating when receiving the resonant frequency F3, whether or not the number of changes between F1 and F2 is equal to N. If this it not the case, an alarm 12 is activated, said alarm possibly being sent to an alarm station indicating the position, as e.g. detected by a GPS-system (Global Positioning System), of the fault of the marking tape so that technical personnel can be sent out to investigate the subterranean marking tape in order to precisely detect the position of the fault and taking possible precautionary steps for avoiding major following breakdowns.

As positioned under a railway track, the marking tape is preferably integrated in a geotextile for supporting the railway track and a possible break in the geotextile indicates that the underground under the railway track is giving in for the weight of the railway track and train and this could be due to subterranean cavities not detected when building the railway track.

Figure 5:
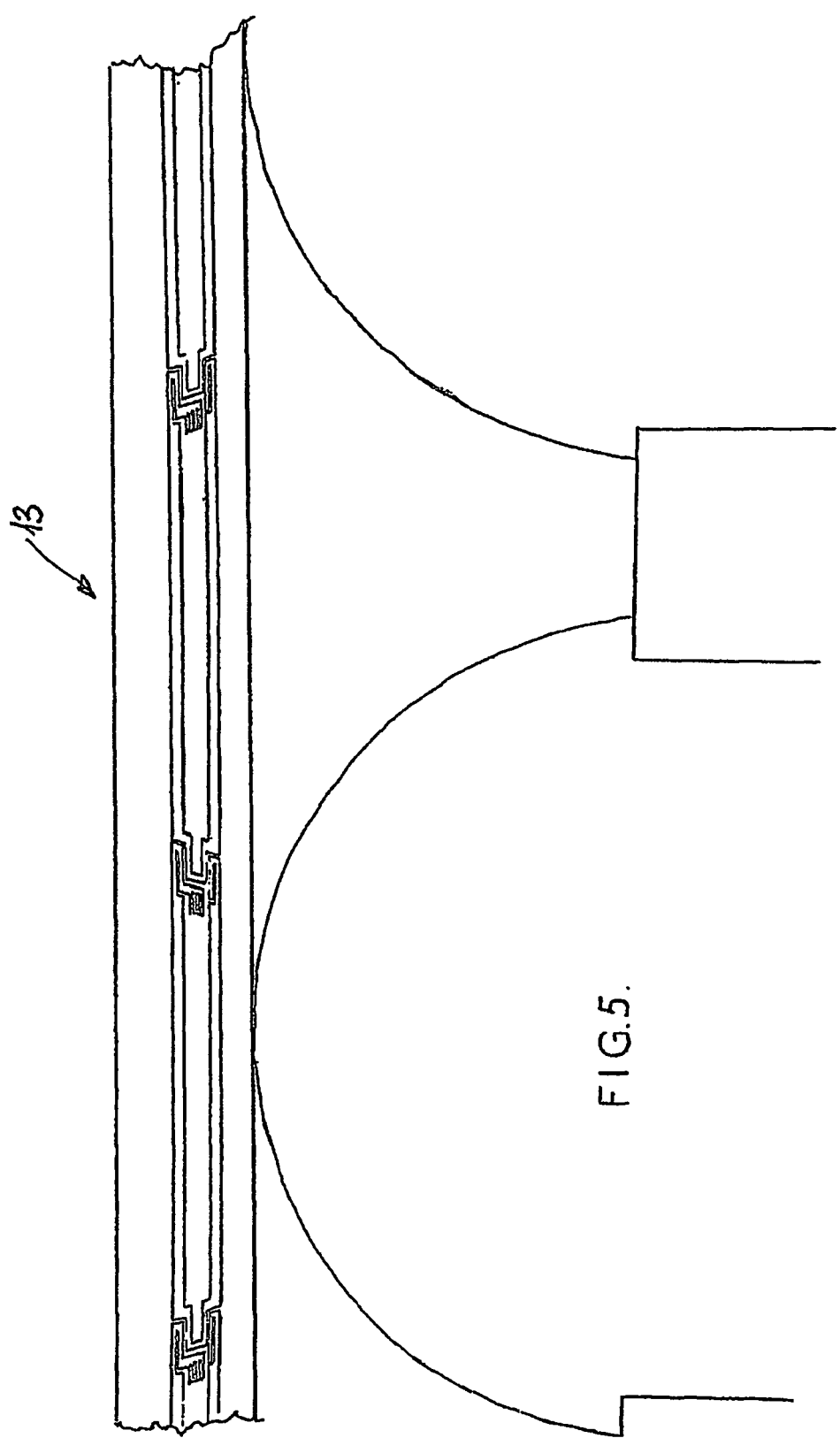

Another usage of the marking tape could be in bridge constructions 13, as schematically indicated in FIG. 5, where again the detection of the integrity of the marking tape may be performed from a car moving on top of the bridge 13.

Figure 6:
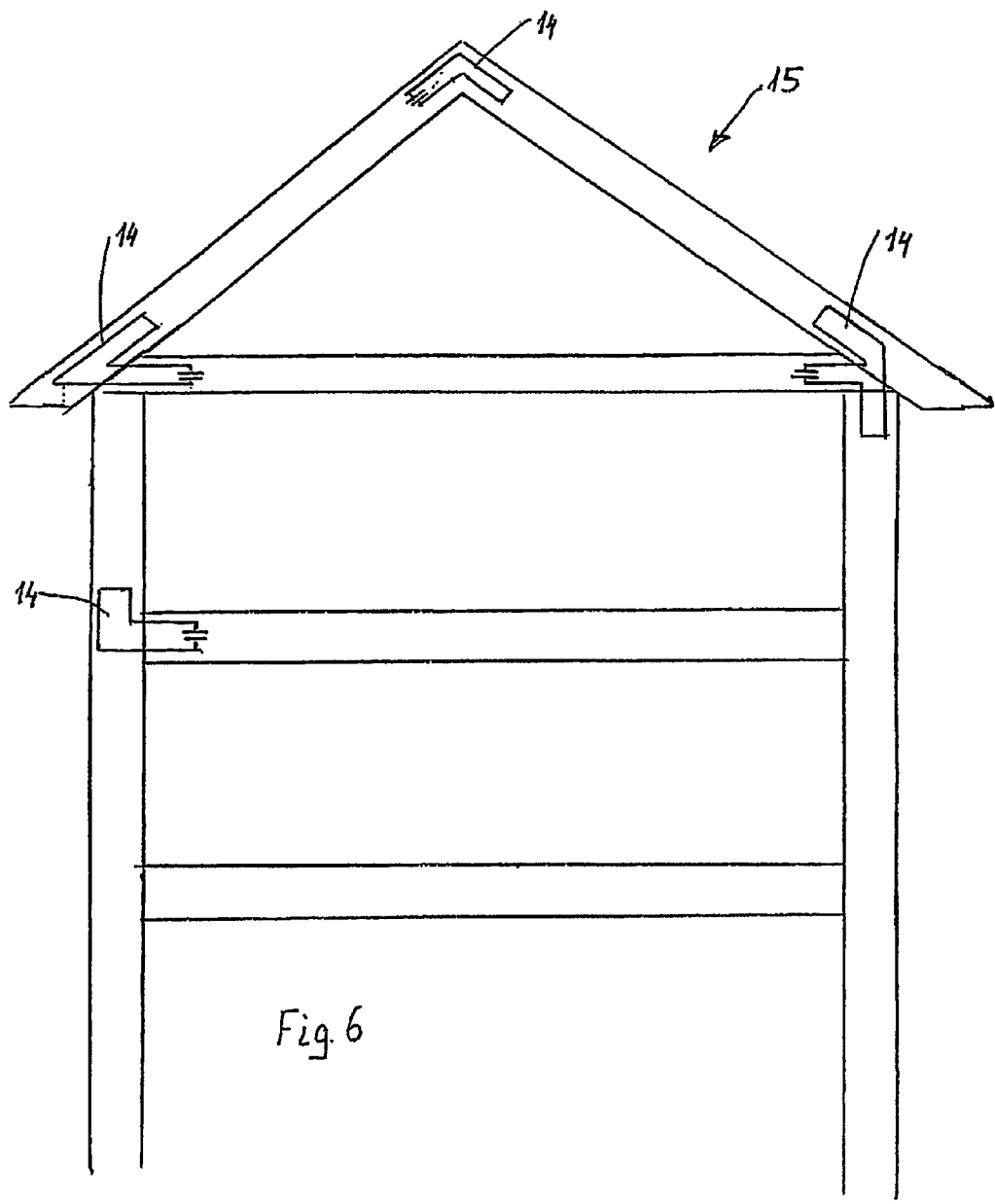

FIG. 6 indicates another possible usage of resonant circuits 14 for detecting defects in a building construction 15. In this example, individual resonant circuits 14 are positioned across connections between different constructional elements in a building 15 in order to be able to detect possible dislocations of these individual construction elements relative to one another. Using such individual resonant circuits 14 makes it possible to detect dislocations, if any, in hidden building constructions in a non-invasive manner. As schematically indicated in FIG. 6, the individual resonant circuits 14 are adapted to the position, in which they are to be used, which is a relatively simple job with the construction of the resonant circuits 14 in the form of conductive layers 2, 3 and 4 on the surfaces of a dielectric plastic film 1.

As is well-known from the use of electronic article surveillance tags in connection with theft prevention in shops and supermarkets, the distance from which the resonant circuit can be detected is mainly dependent on the area of the opening in the inductive coil and the number of windings surrounding this opening. In accordance with the present constructions, the area is very large due to the longitudinal extension of the inductive coils.

The reduced Q-value $$\left(Q = \frac{1}{R}\sqrt{\frac{L}{C}}\right)$$

due to the low inductance L provided by the few or a single winding and the corresponding higher capacity value C for the same resonance frequency $$f\left(f = \frac{1}{2\pi\sqrt{L \cdot C}}\right)$$

is compensated in the construction by reducing the resistance R of the resonance circuit, e.g. by providing the coil with broader conductors, preferably providing a resistance R for the coil, which is below 1Ω, more preferred below 0.5Ω, most preferably below 0.1Ω.

The detection of the resonant frequencies of the individual resonant circuits can be performed using the technique known from the above-mentioned security tags.

If the marking tape is intended to be used in very humid subterranean formations, the marking tape may be supplemented with an isolating layer of substantial thickness on both sides, in order to provide a certain minimum distance between the relatively humid surrounding formations which are electrically conductive to a certain extent.

In the above description, the invention has been explained in connection with preferred embodiments thereof, and many modifications will be evident for a man skilled in the art without departing from the following claims.

The invention claimed is:

1. Marking tape comprising a plurality of passive resonant circuits each having a selected resonance frequency and having a sufficient size and dimensioning to be wirelessly detected when positioned in a hidden place such as an underground position, each resonant circuit comprising an inductive coil formed by a conductive material layer on one surface of a dielectric plastic film, and a capacitor formed by a conductive layer on one side of the dielectric plastic film and an oppositely positioned conductive layer on the opposite side of the dielectric plastic film, wherein the conducting material layers providing the coils and capacitors are formed on the surfaces of the dielectric plastic film in such a way that the coil of each resonant circuit comprises an elongate substantially rectangular coil which is of a longitudinal extent such as to overlap the coil of the next subsequent resonant circuit in the longitudinal direction of the marking tape in order that a possible break in the marking tape results in a loss of resonance or displacement of resonance frequency of at least one of the resonant circuits.

2. Marking tape in accordance with claim 1, characterized by the inductive coils each having only a few windings, preferably one single winding.

3. Marking tape in accordance with claim 1, characterized by different resonance frequencies being provided for marking different objects.

4. Marking tape in accordance with claim 3, characterized by the capacitors being formed with finger-like patches, which can be selectively disconnected from the rest of the capacitors in order to change the resonance frequencies of the resonant circuits.

5. Marking tape in accordance with claim 1, characterized by the provision of different resonance frequencies for individual resonance circuits on the same marking tape.

6. Marking tape in accordance with claim 1, characterized by the marking tape being directly connected to or integrated in the object to be marked and detected.

7. Marking tape in accordance with claim 1, characterized by comprising a distance layer provided on at least one side of the dielectric plastic film and the conducting material layers in order to provide an isolating distance from a few micrometers to several millimeters to possible surrounding conducting materials.

8. Marking tape in accordance with claim 1, characterized by the inductive coils being of elongate form extending primarily in longitudinal direction of the marking tape.

9. Marking tape in accordance with claim 8, characterized by the inductive coils having a length of approximately 0.1-1.5 m.

10. Marking tape in accordance with claim 1, characterized by the coil winding(s) having a resistance below 1Ω.

11. Marking tape in accordance with claim 1, characterized by said marking tape being integrated in a geotextile material in order to be able to detect the integrity thereof.

12. Method of using a marking tape in accordance with claim 1, characterized by comprising the steps of:
    positioning the marking tape in a vehicle-supporting structure, such as a railway track substructure or a road substructure, and
    detecting the integrity of the marking tape and thus the integrity of the supporting structure by detecting the presence of and integrity of the resonant circuits of the marking tape.

13. Method in accordance with claim 12, characterized by comprising the steps of:
    providing the marking tape with a predetermined number of sequentially positioned resonant circuits alternatingly having two different resonant frequencies and followed by a resonant circuit with a third resonant frequency, and
    detecting the integrity of the marking tape and thus the supporting structure from a moving vehicle moving on the vehicle-supporting structure by detecting the number of frequency changes between the two frequencies before the detection of the third frequency and controlling that the counted number of frequency changes equals the predetermined number of expected frequency changes.

14. Method of using a marking tape in accordance with claim 1, characterized by comprising the steps of:
    providing individual resonant circuits on individual marking tapes, said tapes being formed in accordance with a structure, on which they are to be positioned in order to be able to detect the integrity of said structures, and
    mounting said individual resonant circuits on the individual marking tapes on said structures before these are hidden in an overall construction, such as e.g. the roof construction or the floor construction of a house, whereby the integrity of connections between different parts of the construction can be detected in a non-invasive manner by means of suitably constructed activating and detecting devices.

* * * * *